US005436974A

United States Patent [19]

Kovanen

[11] Patent Number: 5,436,974

[45] Date of Patent: Jul. 25, 1995

[54] METHOD OF ENCODING CONFIDENTIALITY MARKINGS

[75] Inventor: David J. Kovanen, Browns Point, Wash.

[73] Assignee: Innovator Corporation, Browns Point, Wash.

[21] Appl. No.: 135,083

[22] Filed: Oct. 12, 1993

[51] Int. Cl.$^{6}$ .......................... H04L 9/00; G09C 5/00; B42D 15/00; B42D 15/10

[52] U.S. Cl. .......................................... 380/51; 380/3; 380/23; 380/59; 283/72; 283/73; 283/74; 283/901

[58] Field of Search ..................... 380/3, 4, 23, 49, 51, 380/55, 59; 283/72–74, 81, 17, 45, 57–59, 901, 902; 355/201

[56] References Cited

U.S. PATENT DOCUMENTS

| | | | |
|---|---|---|---|
| 792,312 | 6/1905 | Bush | 283/71 |
| 1,070,342 | 8/1913 | Hoffman | 380/59 |
| 2,129,364 | 9/1938 | Simons et al. | 283/81 X |
| 3,279,826 | 10/1966 | Rudershausen et al. | 283/901 X |
| 3,675,948 | 7/1972 | Wicker | 283/67 |
| 3,862,501 | 1/1975 | Jemseby | 380/54 |
| 4,234,214 | 11/1980 | Lee | 283/57 |
| 4,303,307 | 12/1981 | Tureck | 283/91 |
| 4,351,547 | 9/1982 | Brooks | 283/93 |
| 4,582,346 | 4/1986 | Caprio | 283/94 |
| 4,678,322 | 7/1987 | Finkel | 355/133 |
| 4,681,348 | 7/1987 | Mowry, Jr. | 283/58 |
| 4,739,377 | 4/1988 | Allen | 355/201 X |
| 4,837,737 | 6/1989 | Watanabe | 380/51 X |
| 4,896,029 | 1/1990 | Chandler | 235/494 |
| 4,998,010 | 3/1991 | Chandler | 235/494 |
| 5,062,666 | 11/1991 | Mowry et al. | 283/57 X |
| 5,149,140 | 9/1992 | Mowrey | 283/93 |
| 5,153,418 | 10/1992 | Batterman et al. | 380/51 X |
| 5,178,418 | 1/1993 | Merry et al. | 283/73 |
| 5,189,292 | 2/1993 | Batterman et al. | 380/51 |

OTHER PUBLICATIONS

Bank Statement, Mar. 14, 1994.

Computer Products Literature Library Order Form, Jan. 15, 1994.

*Primary Examiner*—Bernarr E. Gregory

*Attorney, Agent, or Firm*—Bruce A. Kaser; Miller, Nash, Weiner, Hager & Carlsen

[57] ABSTRACT

The invention disclosed here is a method of encoding serial numbers indicating "confidentiality" or "proprietary information" on printed documents. A group of marks in the form of small-sized dots or equivalent markings are repetitively printed across the face of the document. The placement and location of the markings defines a readable binary serial number. Intermixing the markings with the printed matter on the document makes it difficult or impossible to remove the serial number created by the markings, and they will remain on the document after repeated photocopies of it are made.

18 Claims, 6 Drawing Sheets

METHOD OF ENCODING CONFIDENTIALITY MARKINGS

TECHNICAL FIELD

The invention disclosed here generally relates to ways of preventing copying or forgery of confidential documents. More particularly, the invention relates to ways of marking indicia of confidentiality on documents which bear printed matter.

BACKGROUND INFORMATION

Maintaining confidentiality of proprietary technology and other business information is an important concern for most modern-day businesses. For those businesses which are primarily engaged in the development of new products and technologies, maintaining confidentiality can be crucial to success or failure. Businesses of all kinds are generally concerned with maintaining confidentiality of relatively mundane information which is developed during the regular course of business such as, for example, customer lists, pricing information, income and cost records, employment records, internal memoranda—the list goes on and on.

The conventional ways of maintaining confidentiality are well known. For example, it is the common practice of many businesses to have employees and prospective business partners execute confidentiality and/or nondisclosure agreements. These kinds of agreements are tailored to meet the needs of the particular situation for which they are intended. They range from simple, one-page documents to extremely lengthy and detailed contracts. Much of the time, they specify how confidentiality of proprietary information is to be maintained and will require that "confidential" or the like be marked on important documents. Along the same lines, many companies also stamp sequential serial numbers on confidential documents.

It is difficult or impossible to prevent the physical act of making unauthorized copies. Most businesses have unsupervised photocopy and fax machines on their premises. These machines constitute an open invitation to anyone intent on making or transmitting an unauthorized copy of a confidential document. Moreover, conventional confidentiality markings are easy to remove from proprietary documents before or after making unauthorized copies. Blueprints, for example, will often bear a single confidentiality notice at a location on the document where there is no other printing. Likewise, serial numbers, when used, are typically printed on page margins where there is no other printing. Markings of this kind can easily be "whited out," thereby producing a "clean" document with no markings.

Some companies have developed anticopying technology designed to prevent the use of photocopy machines for making copies of confidential documents. The common thread to this type of approach is that on-site use of individual photocopy machines is authorized by a password entered into the machine. The machines are provided with a means of scanning or detecting documents for confidentiality markings. They permit normal office copying without password authorization when no confidential markings are detected. When confidential markings are detected, however, they will shut down and/or sound an alarm unless the password is entered.

Machines of the above type have limited effectiveness. After all, most individuals having access to confidential documents also have access to the passwords required for making copies of the documents. Moreover, these machines cannot prevent the copyist from physically removing documents and using a conventional copy machine to make unauthorized copies.

The present invention recognizes that the physical act of making unauthorized copies of confidential documents is virtually impossible to prevent. Consequently, the purpose of the present invention is not to prevent copying. Instead, the invention makes it difficult for the copyist to remove visible confidentiality markings from the document. Making it difficult to remove confidentiality markings has a twofold result: First, it creates a certain reluctance to make copies because the document remains traceable to the source as it is passed from one party to the next. Second, when the document falls into a competitor's hands, it then becomes difficult for the competitor to plead innocence to a claim of misappropriation of trade secret.

What is considered to be the invention with respect to accomplishing the above goal, and how it works, is disclosed below.

SUMMARY OF THE INVENTION

The invention is a method of placing small-sized, coded confidentiality markings across the face of a printed document. The markings are intermixed with and/or superimposed on the printed matter on the document which makes them virtually impossible to remove.

In general terms, the method involves repetitively and visibly printing the same coded group of confidentiality markings across the face of a document, or at least a portion of the document, where each group is translatable into a serial number, word, or combination of both. In what is probably the preferred way of practicing the invention, at least with respect to its present state of development, the markings are no more than sequential groups of dots, or similar marks, whose size are small relative to the size of the printed matter normally on the document.

For example, the document may be a written memorandum consisting of text in 12-point type. Individual numerals and letters making up the text would be approximately 1/6 of an inch high. In comparison, each dot may be approximately 1/300 of an inch high or nearly 75 times smaller than the text.

The dots may be printed across the document in many different ways. However, their small size relative to text or drawings, as the case may be, means that they will not interfere with the readability of the document. The dots themselves remain readable regardless of the number of times the document is photocopied and are virtually impossible to remove without also removing most or all of the printed matter on the document.

What is important for the purposes of carrying out the invention is that the location of the beginning and end of each dot group be readily identifiable, and that the print position of each dot within the group be known. Without limiting what is considered to be the scope of the invention, it is believed that the most preferable way of placing dots or equivalent marks on the document is to print them as a binary code. In such case, each dot marked on the document, or lack thereof, as will be further described below, represents a "bit." Although dots may be the most preferable kind of mark, it is anticipated that other types of marks or symbols could be used, as will be further described later.

Each group of dots are printed along a "path" across the document, one group after the next, and are separated by "index" symbols. A single index symbol visibly defines the beginning of each group in some recognizable way. In order to be distinguishable from the markings making up the group, the index symbol may be shaped differently, or at least have a recognizably different physical configuration, and is also small in size relative to the printed matter on the document.

In what is currently believed to be the best way of practicing the invention, the index symbol not only serves to identify and define the beginning of a group, but also orients the direction or print path the group follows across the page for interpretation purposes.

Preferably, the print path is linear and follows a series of imaginary horizontal lines across the document. Dot groups are printed sequentially along these imaginary lines, from one line to the next. Depending on the mode or means for printing dots on the document, the lines may be positioned with respect to the printed matter on the page such that each print path line is in between lines of text, or is printed across lines of text, or alternates between these two conditions from one line to the next. It should be emphasized, however, that in order to take advantage of the invention's ability to provide a high degree of security with respect to printing marks that are difficult to remove, the print path should intersect printed matter on the document.

If not all of the dots in a single group are printed prior to the end of any print path line, then the remaining dots are printed commencing with the beginning of the next following line. Other types of paths, including nonlinear paths, could be implemented without departing from what is considered to be the invention.

Each group is divided into a number of preselected discrete locations where dots or "bits" are selectively printed. Preferably, each location is equidistant with respect to adjacent locations, although this does not necessarily have to be the case in order to practice the invention.

Printing a dot at any given location in a group is read as a binary "1." Not printing a mark at a location is read as a binary "0." The preferred way of printing dots for each group is to print them as an array from the most significant to the least significant bit. However, bits do not necessarily have to be printed or read in this way.

It is important to repetitively print each group of dots, because, as mentioned above, it is preferable to intermix them with printed matter on the document. However, any mark that is overprinted on a letter or line on the document will probably be unreadable. When this event occurs, and it is likely to occur many times, it is presumed that a mark exists at the overprinted location, and is read as a binary "1." Repetitive readings are then compared to verify the presumption.

It is intended that the method of encoding a document, as described above, be used in combination with a conventional confidentiality marking that is prominently displayed on the document. For example, a warning notice such as "THIS DOCUMENT CONTAINS PROPRIETARY INFORMATION—IT HAS BEEN ENCODED WITH A SERIAL NUMBER IDENTIFYING IT AS PROPRIETARY" could also be printed on the document in a prominent manner and in large type. This would explain the purpose of the markings and enhance their deterrent effect with respect to making unauthorized copies.

The invention as summarized above will become better understood upon reviewing the following description, which is to be taken in conjunction with the drawings that are attached to this specification.

BRIEF DESCRIPTION OF THE DRAWINGS

In the drawings, like reference numerals and letters refer to like parts throughout the various views, unless specifically indicated otherwise. A description of the drawings is set forth below.

BEST MODE FOR CARRYING OUT THE INVENTION

Figure 1:
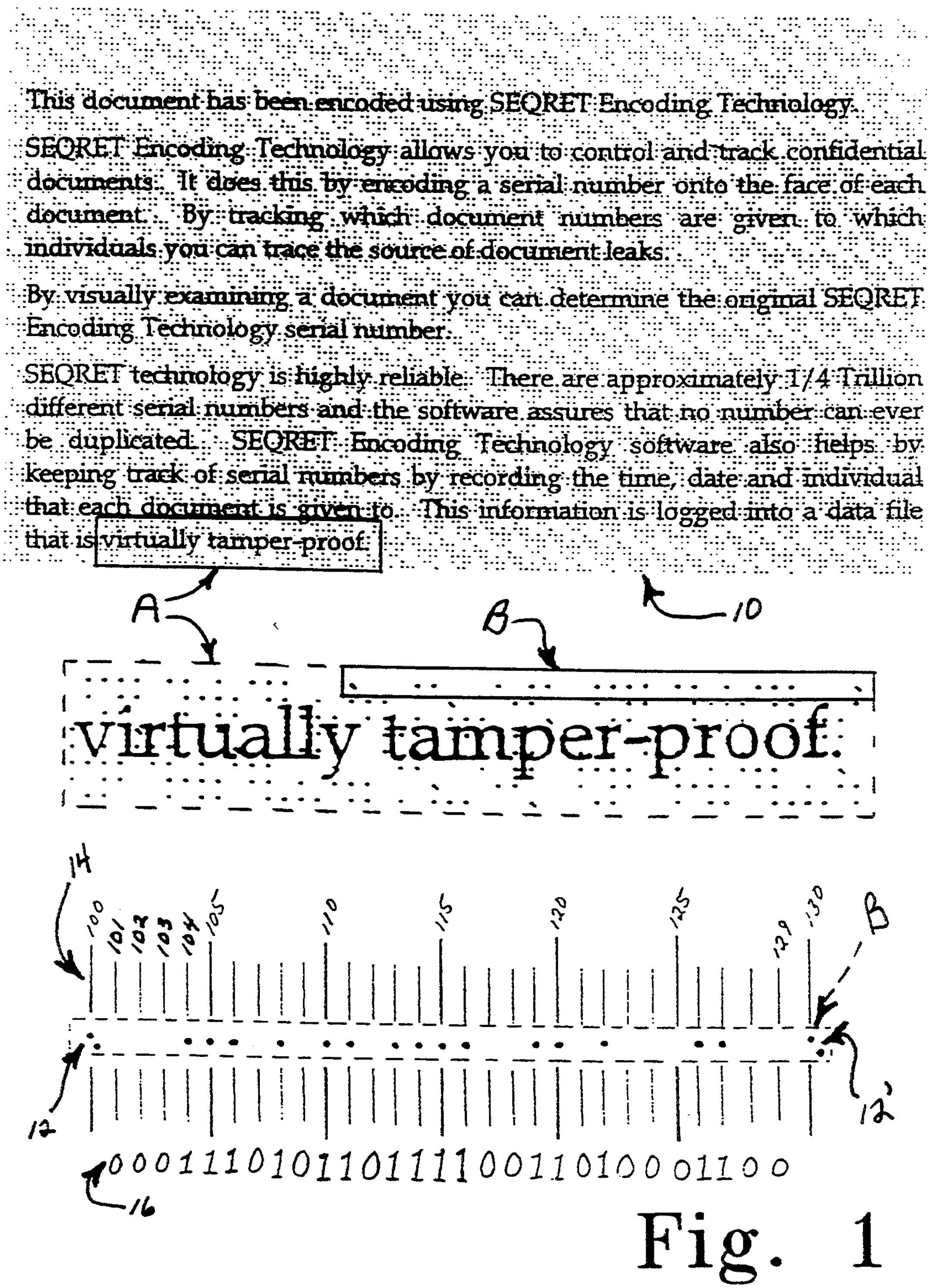
FIG. 1 is a three-part view of a portion of a document showing how the document is encoded with repetitive groups of markings in accordance with the invention, and also shows how each group is indexed across the face of the document.

Referring now the drawings, and first to FIG. 1, shown generally by reference numeral 10 is an example of a document encoded in accordance with the invention. As can be seen, sequential groups of repetitive markings, in the form of a dot pattern, are superimposed over the image of printed text. Each group consists of the same series of dots. Reference A at the bottom of the text outlines an area which is shown enlarged in the middle portion of FIG. 1. Similarly, Reference B outlines a single, enlarged group or segment of dots, which is shown in the bottom portion of FIG. 1.

The beginning of each group or segment is indicated by an index symbol 12. The end of the group is defined by the next following index symbol, 12'. The distance in between the two index symbols 12, 12' constitutes the path along which the group is printed and is divided equally into discrete "dot" or "bit" locations.

The upper scale, indicated by reference numeral 14 in FIG. 1, sets forth a numbering system for the dot or bit positions to the right of index symbol 12. For example, the index symbol 12 is indicated by bit position 100. The first position after the index symbol 12 is indicated by bit position 101. Likewise, the second position is indicated at 102, and so on until the next index symbol 12' is reached at position 130.

A total of 29 separate bit positions are shown between the two index symbols. It is to be understood that this number is for illustrative purposes only. It is presently believed that 40 equidistant bit positions between index symbols may be optimal, and it is to be understood that the density of dots per group or segment could vary. Also, the physical length of the segment could vary, which would not affect the number of dots per group, but would affect the density of dots along the print path between index symbols.

Printing or not printing dots at each position corresponds to writing a binary code. For example, dot position 104 contains a dot. This is read as a "1." Dot position 107 has no dot, which corresponds to "0." The complete binary number illustrated by the segment is shown by the lower scale indicated generally by reference numeral 16 in FIG. 1.

In the illustrative example shown in FIG. 1, a total of $2^{29}$ numbers could be printed from a single group or segment B. Of course, as the skilled person would realize, the binary code could be read as either a number, letters, or combination of both. Similarly, the code could also be read as BCD, Hexadecimal, or other binary forms. Furthermore, dots do not necessarily have to be read in sequential order from left to right, but instead could be read in a pattern defined by the user, i.e., read dot location 110 first (see scale 14, FIG. 1), followed by reading dot position 123, and so on until all dot positions have been read. The form of code and pattern in which it is to be read is defined by the user.

Figure 2:
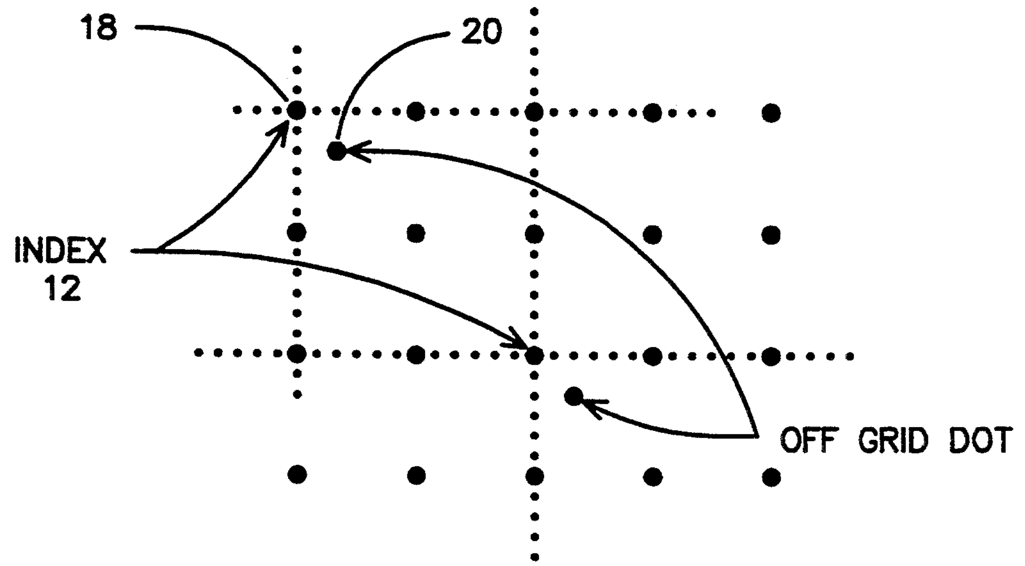
FIG. 2 is a schematic view further illustrating how markings are grouped and indexed across the face of the document.
Figure 3:
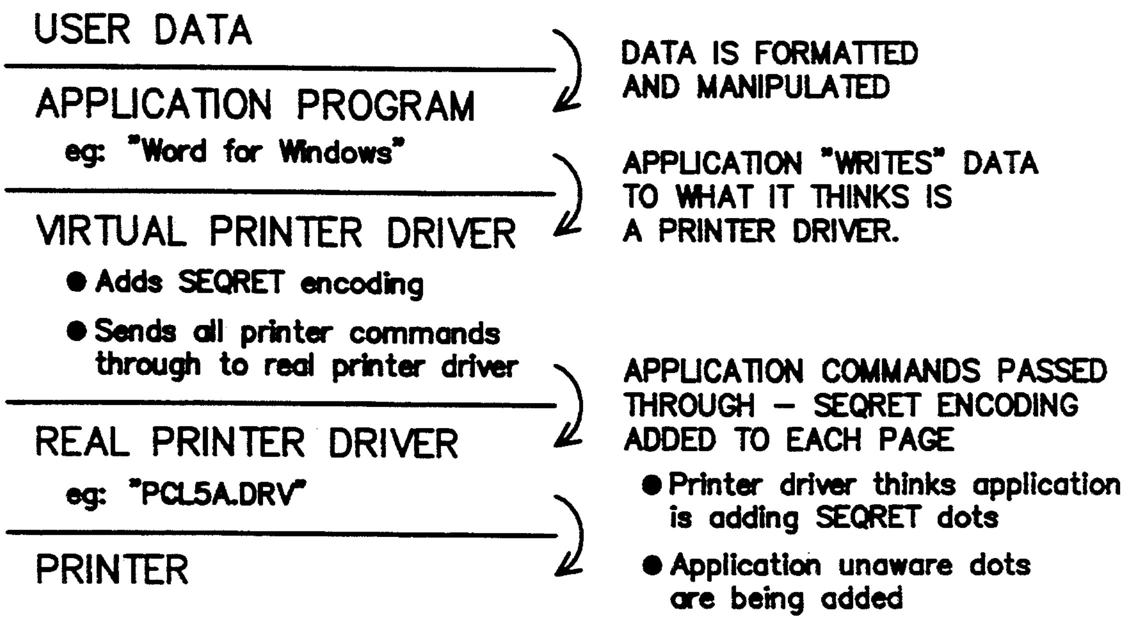
FIG. 3 is a generalized flow chart illustrating programming requirements for applications software designed to control a printer in order to produce the encoded document shown in FIG. 1.
Figure 4:
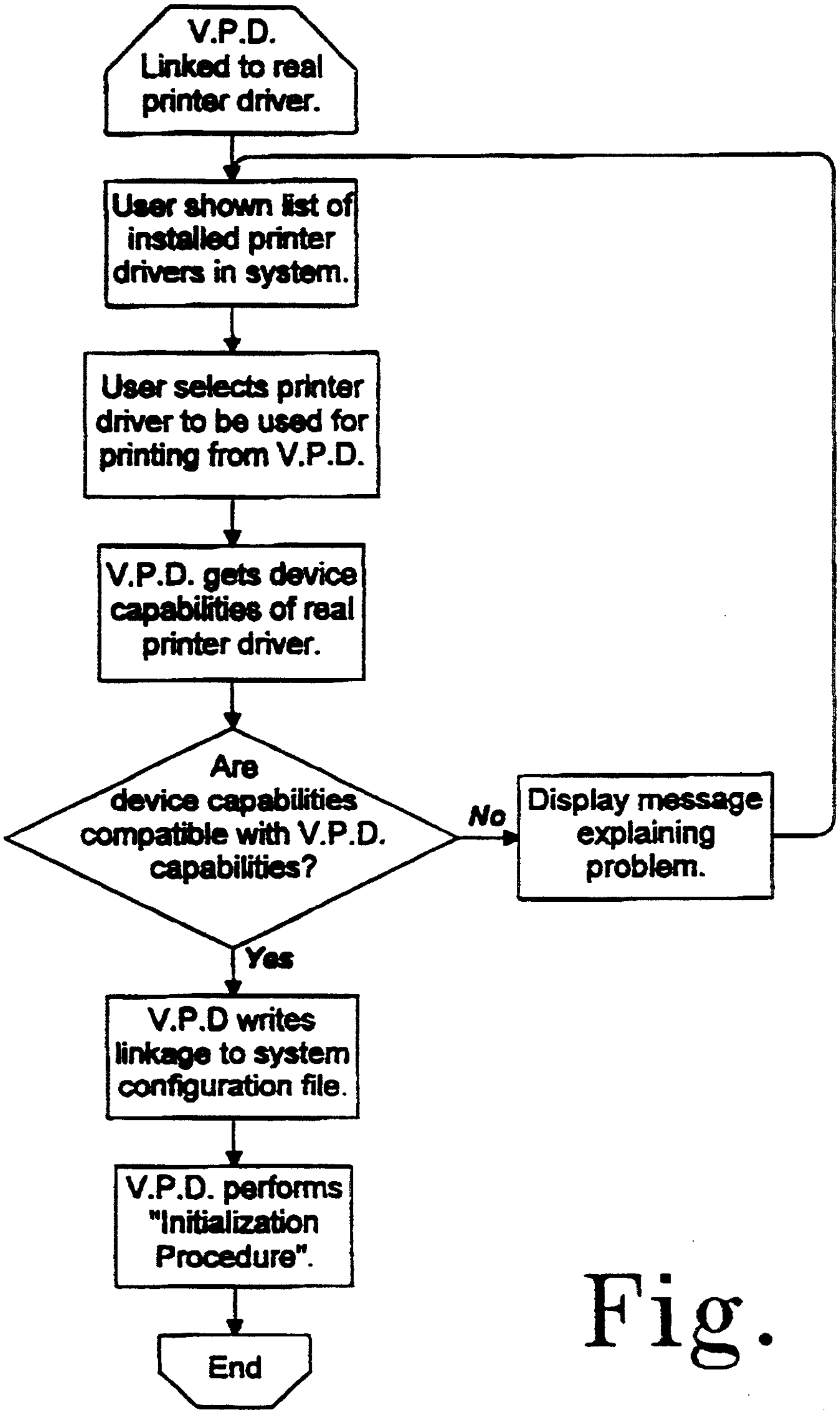
FIG. 4 is a flow chart illustrating the programming requirements for creation of a "virtual" printer driver for encoding documents in accordance with the invention.
Figure 5:
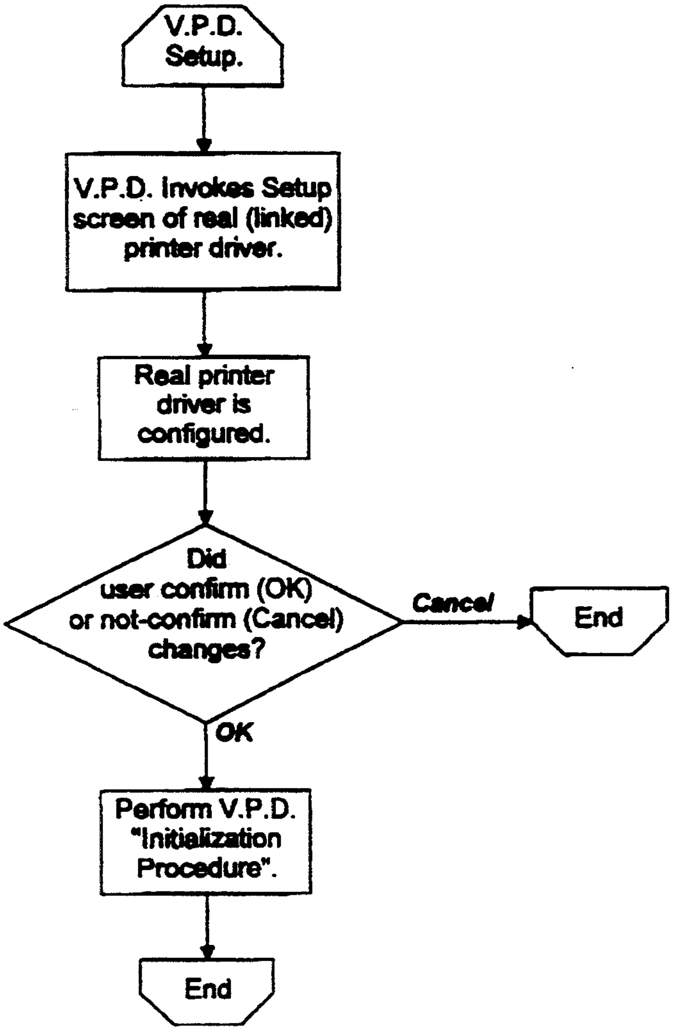
FIG. 5 is a flow chart outlining the setup procedure for the virtual printer driver programming requirements shown in FIG. 4.
Figure 6:
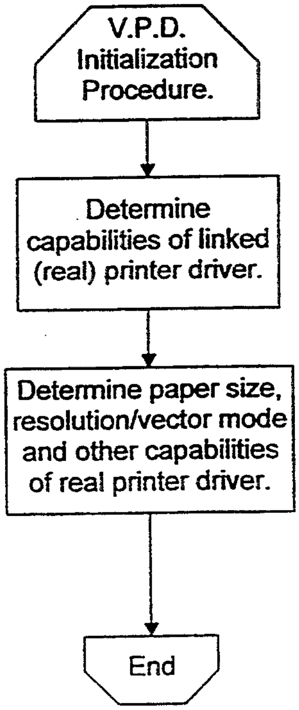
FIG. 6 is a flow chart outlining the initialization procedure for the virtual printer driver programming requirements shown in FIG. 4.
Figure 7:
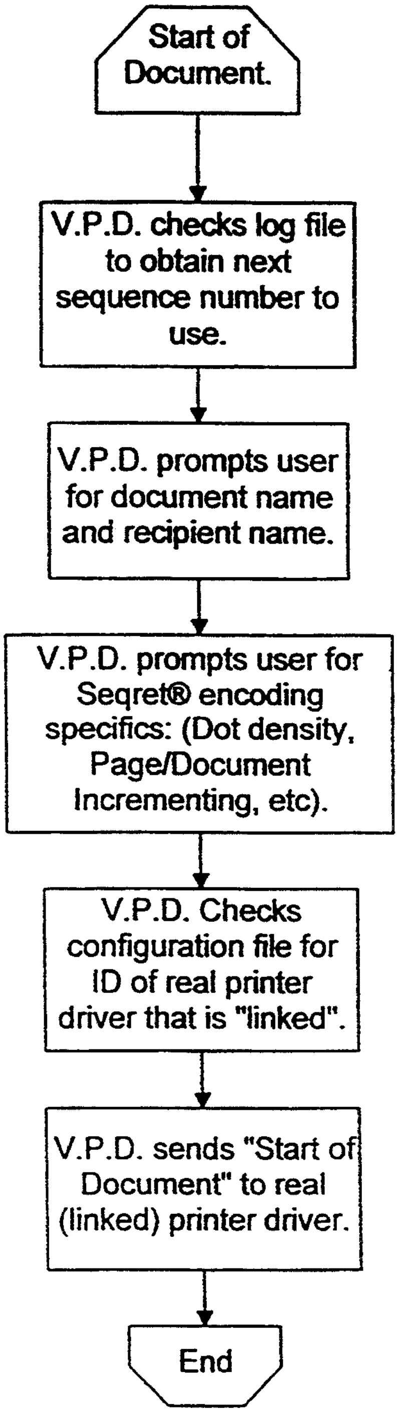
FIG. 7 is a flow chart outlining how a virtual printer driver may receive information from a user and drive a real printer driver in order to encode a document in accordance with the invention.
Figure 8:
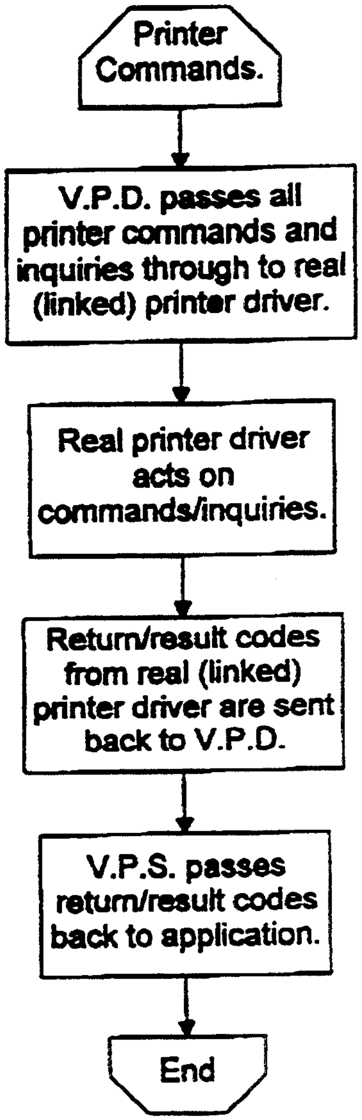
FIG. 8 is a flow chart outlining how the virtual printer driver may pass printer commands to the real printer driver.
Figure 9:
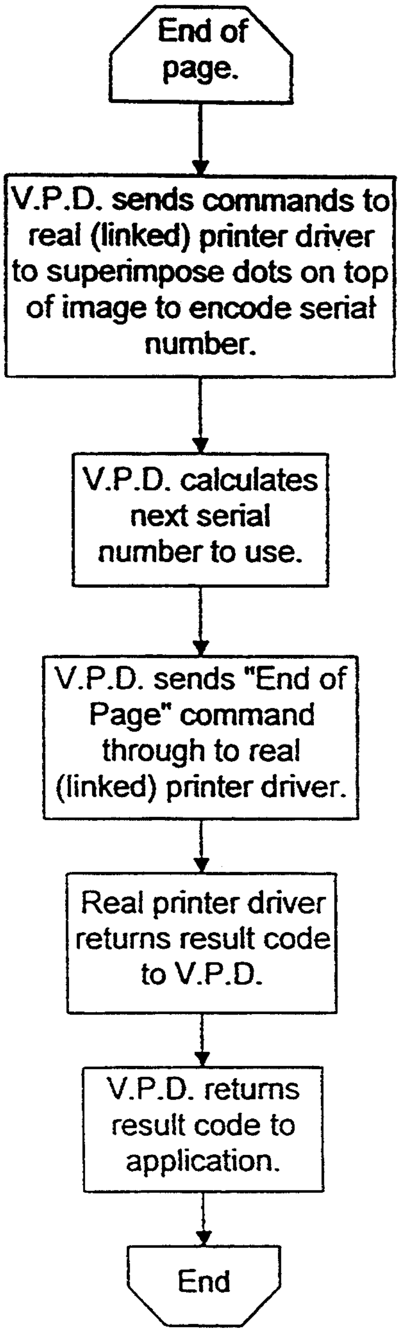
FIG. 9 is a flow chart outlining how the virtual printer driver may send commands to the real printer driver for printing encoding markings on the confidential document.
Figure 10:
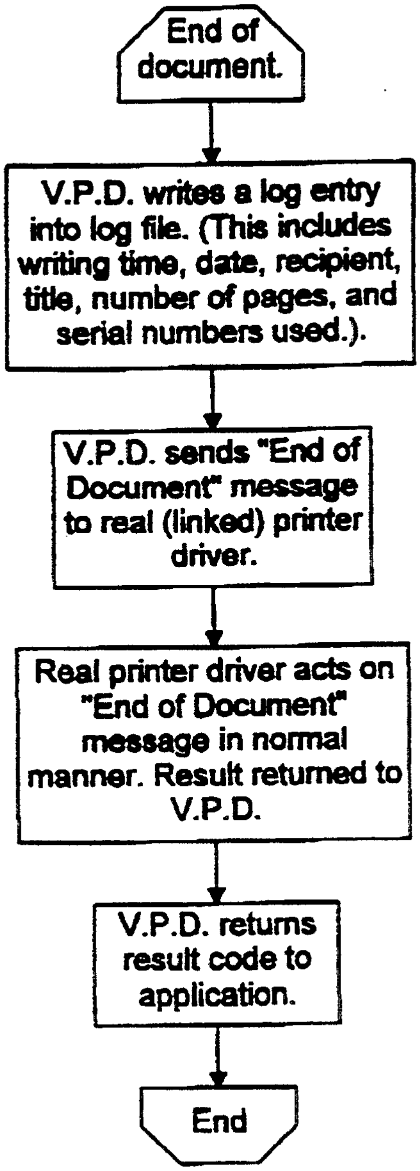
FIG. 10 is a flow chart outlining programming requirements necessary to cause the virtual printer driver to log entries for encoded documents.

Clearly, use of an index symbol 12 is an important part of the invention. Referring now to FIG. 2, the index symbol is shown as two dots. One dot, 18, is on a grid and is aligned with the dots making up the following group (e.g. the other dots making up group B in FIG. 1). The second dot, 20, is off-grid, meaning that it is not read as part of the binary code, but serves as a recognizable indicator that the two dots 18, 20, when taken together, make up an index symbol.

The index symbol 12, as illustrated in FIGS. 1–2, defines the beginning of a group and the orientation of the path following by the group. First, and as was mentioned above, the location of the off-set or off-grid dot 20 serves to trigger identification of the symbol 12 and defines the starting point for deciphering the code made up from the dots in the following group. Second, although the example shown in FIG. 1 indicates that each group is printed and read from left to right, it is possible that groupings could be printed and read up and down, right to left, or even angularly across any given document, so long as direction is predefined for the decoder. Consequently, the index symbol provides the reader with the proper orientation or direction with respect to both print path and decoding bit positions, so that each group may be read from one index symbol to the next. The end result is that the coded serial number can be read from virtually any portion of the document.

Although the index symbol 12 is shown as two dots, 18, 20, in FIG. 2, it could be produced in a variety of other ways. For example, special colors could be used to identify index symbols in situations where the invention is to be used in conjunction with color printers. Another way of providing an index symbol would be to alternate between types of marks used in each group. For example, dots could be used for one group, Xs could be used for the next, and so on, alternating between dots and Xs, thereby creating what would essentially be index "sets" which function equivalently to an index symbol. This method may not be preferable because it lacks any way of providing orientation, unless the shape of the individual markings could define direction. For example, rather than using dots, individual markings could be in the shape of small triangles where one side of the triangle (probably the base side) defines orientation and direction for reading each group.

It should be mentioned at this point that, like the index symbol 12 described above, the individual dots used in each group could be replaced by marks of a different form, e.g., small rectangles, triangles, miniature letters, etc. What is important with respect to reading a group is the identification of "bit" location—not the form of mark making up the bit.

As mentioned above, each group of markings in the segment indicated at reference B in FIG. 1 can either be extended or made more dense. In other words, the spacing from one dot to the next can be varied at the user's option. It is believed that a print density of approximately one dot every $\frac{1}{4}$ of an inch is preferred. The preferred dot size is presently believed to be 1/300th of an inch in diameter. This print density and dot size will be much less dense than the text or other printed matter on the document and will not interfere with readability of the printed matter.

For the sake of comparison and illustration, the normal density of printed text on a page is 5 to 10 percent. In other words, 5 to 10 percent of each page of text is covered by printed matter. Printing one dot per $\frac{1}{4}$ of an inch, coupled with a dot size of 1/300th of an inch, results in a dot density of approximately 0.018 percent. This is significant relative to well-known check protection screening patterns, for example, which are 5 to 20 percent dense. By way of comparison, in the present invention, the ratio of encoding to printed matter is about 1 to 400, while conventional technology is 1:1 or 4:1.

Referring to the top portion of FIG. 1, and reference A, in particular, it can be seen that some dots will be overprinted on text. As such, overprinted dots are not readable. For this reason, repetitive readings of individual segments must be taken. With the print density and dot size specified above, three readings will provide a 99.5 percent accuracy with a 40 bit scheme.

As an alternative, it may be possible to print "negative" or white dots. In such case, the white dots would appear when superimposed over dark text or other dark printed matter. It is not believed that this method would be more preferable than dark markings.

It is presently believed that the invention is best implemented in the form of applications software having the capability of commanding a printer to encode a document during the printing process. FIGS. 3–10 outline the general requirements for suitable applications software.

As the skilled person would appreciate, functional applications software could be written in many different ways. However, a preferred way may be to develop a "virtual" printer driver which issues commands to a conventional printer driver, thereby causing encoded markings to be printed on documents as they are printed.

The development of applications software is not necessary to practice the invention, however. For example, documents could be encoded in accordance with the invention by simply preprinting paper bearing the encoding and using the preprinted paper in replacement of regular paper in a laser printer, or the like.

The advantage to incorporating the invention into applications software is that it provides an easy way to facilitate use of the invention. The software could automatically add encoded page serial numbers, for example, which would vary from one page to the next. It would also provide a quick and easy means of keeping track of encoded documents. The user could preselect items such as dot density, log information, title, recipient, number of pages, time, and date. Much or most of this information could be prompted by the software. Coded serial numbers could either be input by the user or automatically generated.

Printer drivers and "virtual" printer drivers are well-known in the art. Both pertain to the well-known MS-DOS (trademark) and Microsoft Windows (trademark) operating systems. For this reason, it is not necessary to explain the specifics as to how to develop or implement such drivers in connection with implementing the invention as described above, other than the description set forth below.

In the Microsoft Windows (trademark) operating system, a printer driver receives print request commands from an application program. The purpose of the driver is to translate these commands into "print bands" and then transmit a bit map of the printed document to the printer, using the native language of the printer. A printer driver knows how to translate print requests from an application into the specific language of one or a small number of printers, because the print requests are defined and uniform from the standpoint of the application. The application has no direct control over the hardware.

Because of the way printer drivers operate, it is also possible to install virtual, or "filtering" printer drivers into the operating system. The virtual driver appears to the application as a printer, and the print requests can be redirected to another printer driver, which then acts as if the virtual driver is an application with respect to it.

As the skilled person would know, an application is, of course, a piece of software such as a spreadsheet or word processor that provides end-user functionality and tries, as much as possible, to insulate itself from the hardware that it runs on. The application generates documents, while the function of a driver is to not understand the content of a document, but instead, is to blindly carry out print requests from the application.

The typical printer driver (or virtual printer driver) receives the same kinds of messages. Of these, the most important for the purposes of carrying out the invention include: (1) Start of Document; (2) End of Document; (3) Start of Page; and (4) End of Page.

The Start of Document message indicates that a new document is about to be created. The software driver desiring to implement the encoding described above would check a file for the next available serial number. It would then prompt the user for descriptive information such as, for example, the recipient.

The End of Document message indicates that the document has completed printing. Upon receipt of such message, the software implementing the invention would then update the serial number file by writing the last used serial number into the file. Other information, such as identification of recipient, would also be written into the log file.

The encoding, as shown in FIG. 1, can be added to the document either at the start of a page or at the end of a page. Because many printers print a page in "print bands" that are several inches high, it is preferable to use the Start of Page message to begin the encoding, and to actually alter the print image at the end of each print band.

Since a typical print band contains a bit map of the image that is about to be printed, after all text and graphics have been generated, the bit map is easily available to be altered at the point in time just prior to committing it to paper.

To alter the bit map, the driver (or virtual printer driver) would determine the specific bits that are to contain black bits and would then set the bit. This would cause the bit to appear on the paper as a black dot in accordance with the encoding shown in FIG. 1. If white or "negative" dots are to be printed, the bits can be cleared. This would have the effect of printing white dots superimposed over black text or other printed matter.

The process of determining the bit positions to set or clear would be known to an experienced programmer. To summarize this process in the context of the present invention, first, an index dot would be printed. Then, the next bit position would be determined in the horizontal direction, at least if that was the direction of the print path. If four dots per inch were the desired resolution, then this would be 0.25* (printer pixels per inch). In accordance with the FIG. 1 example, the MSB (most significant bit) of the code would be printed, and then the code would be shifted and the next position determined. This would proceed across the page to its end. At the end of the page, the "Y" direction would move by the same formula as the "X" position, and the encoding would continue.

In determining whether a "1" or "0" is to be printed, the 40-bit code, for example, would appear as a five-byte value. The five bytes would be bit-rotated so that bits became more significant (left on most machines). The high-order bit would then be tested to determine if a black "1" or white "0" dot is to be printed. This is illustrated in the attached printout, although the 40-bit value is broken into a 16-bit and 32-bit value for implementation reasons concerned with the language.

At the end of each page, indicated by the end-of-page message, the serial number could be incremented, depending upon whether the program increments the serial number for every page or for every document.

The distinction between a printer driver (or virtual printer driver) and the application is an important one. Many applications have the ability to serialize document pages and to print dots on a page. However, by implementing the coding and serialization within the printer driver, significant advantages can be obtained. Most importantly, the serialization and addition of coding can apply to all printed documents from all applications without each application having to have special logic necessary to serialize and encode the document.

The advantage of using a virtual printer driver is that the addition of serialization and coding is both independent of the application and is also independent of the model and capabilities of the printer hardware, thereby adding significant functionality without facing every variation of hardware, and, consequently, needing to rewrite every application.

It should be understood that almost any operating environment can support the concept of a virtual printer driver, provided only that the operating system allows an installable device driver to make calls into other installable device drivers, as virtually every modern system does.

In the older, less flexible MS-DOS (trademark) environment, a virtual printer driver would be implemented by "trapping" the printer interrupt of the ROM BIOS. Print requests would then go to the "trapping" code (the virtual printer driver) and then be rerouted to the address that the interrupt pointed to prior to the trapping. In MS-DOS (trademark), there is no Start of Document message, no End of Document message, and the End of Page messages are imbedded into the print commands. However, determining these events is well understood by all MS-DOS (trademark) driver programmers. Start of Page occurs when characters begin arriving. Start of Document occurs when the first character arrives following an End of Document. End of Document is usually determined by a time-out of several seconds, or by the application program ending. The End of Page is printer specific, and is determined by recognizing the page eject code, typically "form feed, " for the specific printer installed.

Thus, in an MS-DOS (trademark) environment, the coding would function in the same fashion as in a Microsoft Windows (trademark) environment, albeit with a different method of receiving printer messages. There is one important MS-DOS (trademark) distinction to consider, and that is that usually there is no device context ("DC") or printer band. Printing from the application is in the printer's native language. Thus, the device driver would, at the start or end of each document, need to send the native commands required to position the print head to the desired location and then "plot" the desired dot. This process is also very well understood by any programmer who is familiar with MS-DOS (trademark).

The MS-DOS (trademark) solution is similar to other "stream-oriented" devices, which are common in local area networks ("LANs") and the UNIX (trademark) operating system. In this case, an End of Document message is usually transmitted, and the virtual device driver would interpret the stream of print commands and insert additional commands to plot the dots on each page in a manner that is essentially identical to an MS-DOS environment. Again, this programming technique is very well understood.

Attached to this specification are five pages of source code for implementing the method of encoding documents as described above. The code is written in Microsoft Professional Visual Basic, version 3.0.

Last, some of the attached drawings and the attached code use the word SEQRET in connection with the disclosure of the invention. As of the filing date of this document, the invention has not been offered for sale, published, used in public, or commercialized in any manner. It is intended that SEQRET shall be the trademark used in connection with future sales of the invention.

The preceding description is not to be read in a limiting sense. It is conceivable that the method described above could be changed in many ways without departing from what is considered to be the spirit and scope of the invention. Therefore, the invention is to be defined solely by the claims which follow, the interpretation of which is to be made in accordance with the well-established doctrines of patent claim interpretation.

What is claimed:

1. A method of placing a coded serial number on the face of a document, the document bearing printed matter other than the coded serial number, the method comprising:
   defining a readable code from a group of marks, the group being defined by a set of possible print locations and selectively printing marks at certain predefined locations within the set of possible print locations; and
   repetitively printing the group of marks across at least a portion of the face of the document; including
   intermixing at least one of the repetitively printed groups of marks with at least some of the printed matter on the document.

2. The method of claim 1, including repetitively printing the group of marks along a plurality of lines extending across the face of the document.

3. The method of claim 1, including
   printing at least one index symbol on the face of the document, wherein the index symbol defines the physical orientation on the document for the set of possible print locations corresponding to printed groups of marks.

4. The method of claim 1, wherein the set of possible print locations comprise a finite number of equidistant marking positions.

5. The method of claim 1, wherein the marks of each group have a maximum print size dimension within the range of 0.003 to 0.007 inches.

6. A method of placing a coded serial number on the face of a document, the document bearing at least some printed text having a certain print size dimension, the method comprising:
   defining a readable code from a group of marks, the group being defined by a set of possible print locations and selectively printing marks at certain predefined locations within the set of possible print locations; and
   repetitively printing the group of marks across at least a portion of the face of the document, wherein the marks of each group have a maximum print size dimension that is smaller than the print size dimension of the printed text.

7. The method of claim 6, including
   printing at least one index symbol on the face of the document, wherein the index symbol defines the physical orientation on the document for the set of possible print locations corresponding to printed groups of marks.

8. The method of claim 6, wherein the marks of each group have a maximum print size dimension within the range of 0.003 to 0.007 inches.

9. The method of claim 6, including intermixing at least one of the repetitively printed group of marks with at least some of the printed text on the face of the document.

10. The method of claim 6, wherein the set of possible print locations are equidistant from each other.

11. A method of placing a coded serial number on the face of a document, comprising:
   defining a readable code from a group of marks, the group being defined by a set of possible print locations and selectively printing marks at certain predefined locations within the set of possible print locations; and repetitively printing the group of marks across the face of the document, including printing at least one index symbol on the face of the document, wherein the index symbol defines the physical orientation on the document for the set of possible print locations corresponding to printed groups of marks.

12. The method of claim 11, wherein the marks of the group have a maximum print size dimension within the range of 0.003 to 0.007 inches.

13. The method of claim 11, wherein the set of possible print locations are equidistant from each other.

14. A method of placing a coded serial number on the face of a document bearing printed matter, comprising:

defining a readable code from a group of marks, the group being defined by a set of possible print locations and selectively printing marks at certain predefined locations within the set of possible print locations; and printing the group of marks across the face of the document, including intermixing the group with at least some of the printed matter, in a manner so that the markings do not interfere with the readability of the printed matter.

15. The method of claim 14, including repetitively printing the group of marks across the face of the document.

16. The method of claim 14, including printing at least one index symbol on the face of the document, wherein the index symbol defines the physical orientation of the set of possible print locations corresponding to the printed group of marks.

17. The method of claim 14, wherein the set of possible print locations comprises a finite number of equidistant marking positions.

18. The method of claim 14, wherein the marks of each group have a maximum print size dimension within the range of 0.003 to 0.007 inches.

* * * * *